Jan. 21, 1941.    R. P. KROON    2,229,415
VARIABLE SPEED TRANSMISSION
Filed June 10, 1938    2 Sheets-Sheet 2

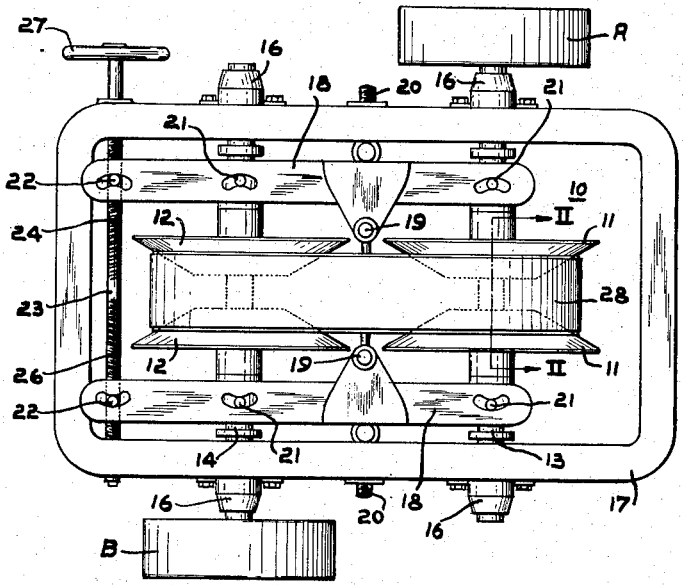
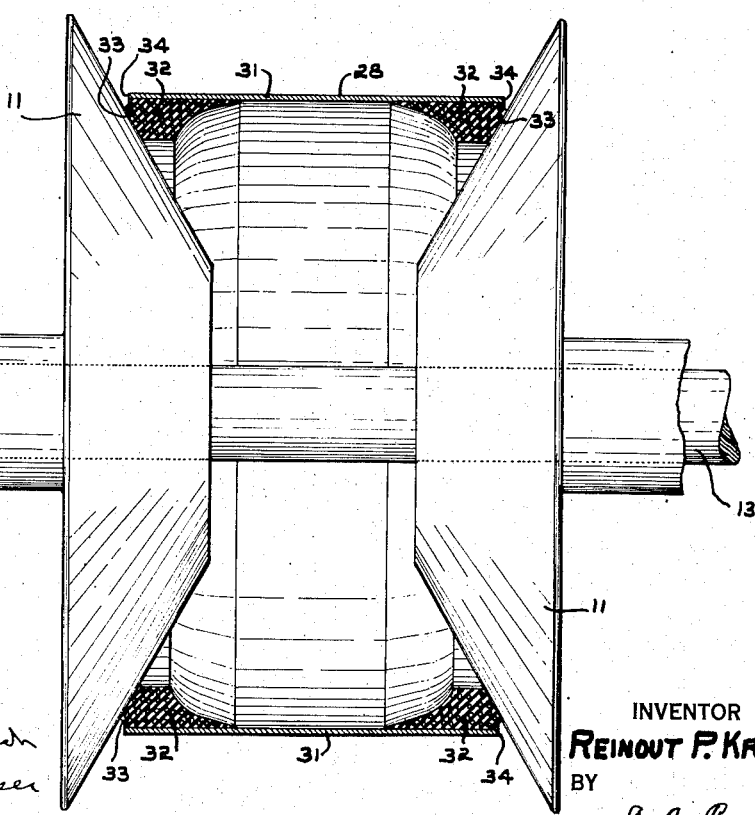

WITNESSES:
Ralph T. French
James F. Mosser

INVENTOR
REINOUT P. KROON.
BY
A. B. Rivers
ATTORNEY

Patented Jan. 21, 1941

2,229,415

UNITED STATES PATENT OFFICE 2,229,415

VARIABLE SPEED TRANSMISSION

Reinout P. Kroon, Swarthmore, Pa., assignor to Westinghouse Electric & Manufacturing Company, East Pittsburgh, Pa., a corporation of Pennsylvania Application June 10, 1938, Serial No. 212,865

13 Claims. (Cl. 74—234)

This invention relates to variable-speed transmission mechanism of the expansible cone pulley and belt type and it has for an object to provide a transmission of this character with a belt of such material that the portions thereof curving about the pulleys have such inherent transverse stiffness as to make unnecessary the use of transverse stiffening elements commonly employed with transmissions of this type.

A further object of the invention is the provision of a composite transmission belt comprised of a thin, flat, metallic band having spaced traction members at its edges.

Another object of the invention is the provision of a transmission belt so constructed as to provide a material reduction in weight over the belts having transverse stiffening means, as heretofore used. With the use of a relatively light-weight belt the speed can be materially increased, resulting in a corresponding increase in the horsepower transmitted by a transmission assembly of a given size. Heretofore, transmissions of this type have been seriously limited as to the horsepower that could be transmitted, due to the weight of the belt and stiffening means, and the resulting centrifugal forces acting thereon.

These and other objects are effected by my invention as will be apparent from the following description and claims, taken in connection with the accompanying drawings, forming a part of this application, in which:

Fig. 1 is a somewhat diagrammatic plan view of a variable-speed transmission mechanism embodying my invention;

Fig. 2 is a transverse sectional view taken along the line II—II of Fig. 1, looking in the direction of the arrows;

Figure 3:
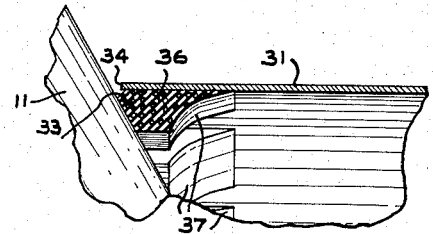
Figs. 3 and 4 are transverse sectional and side elevational fragmentary views, respectively, of a modified form of belt.
Figure 4:
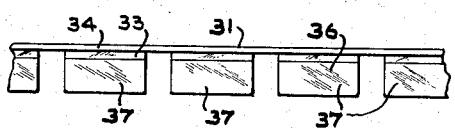
Figure 5:
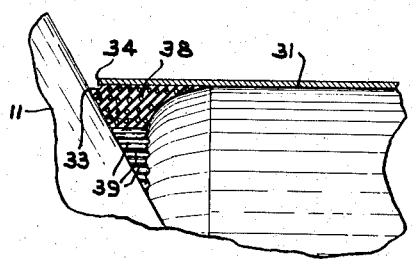
Figure 6:
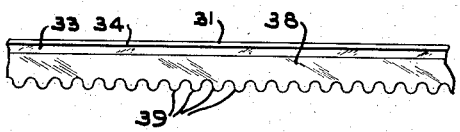
Figure 7:
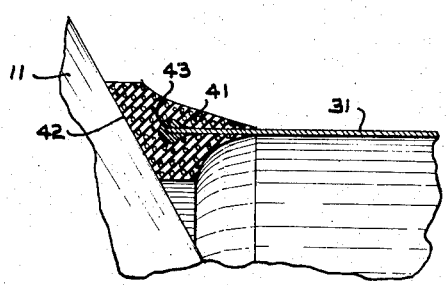
Figure 8:
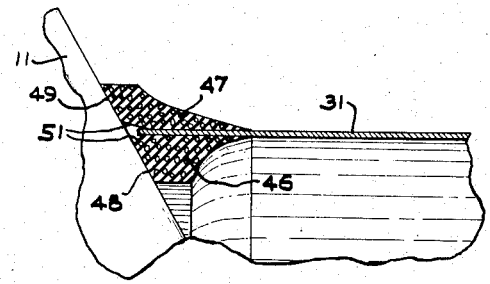

Figs. 5 and 6 are views similar to Figs. 3 and 4, showing a further modification of the belt; and, Figs. 7 and 8 are fragmentary transverse sectional views of two additional modifications of the belt.

In the drawings, there is shown, at 10, a variable-speed transmission mechanism comprised of a pair of aligned pulleys having opposed flanges 11, 11 and 12, 12, provided with conical traction surfaces; "conical" being used in the sense of a suitable convergent surface of revolution. The flanges are keyed to and slidable longitudinally on shafts 13 and 14, respectively, which are journaled in bearings 16 secured to a frame 17.

A pair of double levers 18 are pivotally connected intermediate their ends, as at 19, to a rod or shaft 20 extending transversely of the frame, and located midway of the shafts 13 and 14. These levers are connected to the pulleys 11 and 12, at 21, whereby pivoting of the levers about their fulcrums 19 effects longitudinal sliding movement of the pulley flanges on their respective shafts.

The levers 18 are threadedly connected, as at 22, to a shaft 23 having right-hand and left-hand threads 24 and 26, respectively, and carrying at one end a handwheel 27 by which the shaft may be rotated to effect pivotal movement of the levers.

Upon rotation of the handwheel 27 the levers 18 will be pivoted about their fulcrums 19, with the result that the pulley flanges 11 will be moved away from each other and flanges 12 moved toward each other a corresponding distance, or vice versa, depending upon the direction of rotation of the handwheel.

Power may be supplied to the mechanism from an external source connected with the pulley A, and transmitted from the shaft 13 and associated pulley 11 through the novel transmission belt 28, to be hereinafter described, to and through pulley 12 and shaft 14 to the pulley B, from whence the power may be delivered to any desired device, all in a manner well-known in the art.

In the embodiment illustrated in Fig. 2, the novel composite transmission belt 28 is comprised of a flat, relatively thin, flexible metallic band 31 having attached to its inner face, adjacent the edges thereof, traction members 32 which, preferably, are corded rubber strips, the cords reducing excessive distortion of the rubber.

The metal band develops a high resistance to buckling and collapsing from transverse edge loading as it assumes arcuate shapes at its areas of contact with the pulleys, thus eliminating the necessity for the provision of transversely extending stiffening means, as has been the practice heretofore.

The traction members are secured to the inner surface of the metallic band in any suitable manner, preferably, by vulcanizing. The outer edges 33 of the traction members are bevelled at an angle corresponding approximately to the tapered conical faces of the pulleys, for cooperation therewith. The outer edges of the areas of contact between the traction members and the metallic band are spaced inwardly slightly, at 34, from the edges of the latter, and the traction members are bevelled sharply from this point toward their outer edges to avoid cutting thereof by the edges of the band.

In Figs. 3 and 4, there are shown traction members 36 similar in cross section to those of Fig. 2, but differing therefrom in that the strip is separated into a plurality of spaced blocks 37, this construction facilitating longitudinal bending of the traction members about the pulleys.

The traction members 38 of Figs. 5 and 6 differ from those of Fig. 2 in that the former are provided with inner corrugated surfaces 39, facilitating longitudinal bending of the members.

The traction members of Fig. 7 are comprised by strips 41, secured to both the inner and outer surfaces of the band 31, and having a substantially flat tapered edge 42 for frictional engagement with the flanges of the pulleys. The edges of the flat band are provided with beads 43 of smooth rounded cross section to prevent cutting of the traction members 41 by the otherwise relatively sharp edges of the band.

In Fig. 8, there is shown a modified traction member comprised by corded rubber strips 46 and 47 attached to the inner and outer faces, respectively, of the band 31, and provided with substantially flat tapered edge surfaces 48 and 49, respectively, for frictional contact with the tapered faces of the pulley. In this embodiment, corners of the strips adjacent to the traction surfaces and to the band are relieved, as at 51, to prevent cutting of the rubber by the relatively sharp band edges.

While the band 31 has been referred to as being metallic, it is not intended to so limit the invention, as materials of a cellulosic nature, and others, obviously might be used. The term "rubber," as used in both the specification and the claims is intended to cover not only natural rubber, but also rubber of a synthetic nature. The term "belt," as used in the specification and claims, includes not only the band 31 but also the traction members secured thereto.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a variable speed transmission mechanism, a belt for use with a pair of pulleys, each pulley having a pair of flanges provided with opposed tapered traction surfaces against which the edges of the belt abut, said belt comprising a substantially inextensible, flexible band subject to edge loading where its edges face the opposed traction surfaces of the pulleys as it curves about the latter, and providing stiff, arcuate structures having high resistance to buckling and collapsing under such edge loading, and traction means secured to said band at the edge portions thereof having driving surfaces on their outer faces only for frictional cooperation with the tapered surfaces of the pulley flanges, the thickness of said belt being only a minor fraction of the width thereof.

2. A structure as specified in claim 1, wherein the traction means have outer edges beveled at an angle substantially corresponding to the tapered surfaces of the pulley flanges.

3. A structure as specified in claim 1, wherein the traction means are of rubber and have outer edges beveled at an angle substantially corresponding to the tapered surfaces of the pulley flanges.

4. In a variable speed transmission mechanism, a belt for use with a pair of pulleys, each pulley having a pair of flanges provided with opposed tapered traction surfaces against which the edges of the belt abut, said belt comprising a substantially inextensible, flexible metal band subject to edge loading where its edges face the opposed traction surfaces of the pulleys as it curves about the latter, and providing stiff, arcuate structures having high resistance to buckling and collapsing under such edge loading, and continuous traction strips secured to said band at the edge portions thereof having driving surfaces on their outer faces only for frictional cooperation with the tapered surfaces of the pulley flanges.

5. A structure as specified in claim 4, wherein the traction means are vulcanized to the band.

6. In a variable speed transmission mechanism, a belt for use with a pair of pulleys, each pulley having a pair of flanges provided with opposed tapered traction surfaces against which the edges of the belt abut, said belt comprising a flat, substantially inextensible, flexible metal band subject to edge loading where its edges face the opposed traction surfaces of the pulleys as it curves about the latter, and providing stiff, arcuate structures having high resistance to buckling and collapsing under such edge loading, and rubber traction means secured to the inner surface of said band adjacent the edges thereof having driving surfaces on their outer faces only, the outer edges of said traction means being beveled at an angle substantially corresponding to the tapered surfaces of the pulley flanges for cooperation therewith, the thickness of said belt being only a minor fraction of the width thereof.

7. In a variable speed transmission mechanism, a belt for use with a pair of pulleys, each pulley having a pair of flanges provided with opposed tapered traction surfaces against which the edges of the belt abut, said belt comprising an endless, flat, substantially inextensible, metal band subject to edge loading where its edges face the opposed traction surface of the pulleys as it curves about the latter, and providing stiff, arcuate structures having high resistance to buckling and collapsing under such edge loading, and corded rubber edging secured to its inner surface and lying entirely within the area bounded by the plane of said inner surface, the abutment of the belt edges with the opposed pulley traction surfaces constituting the sole engagement of the belt with the pulleys.

8. A structure as specified in claim 7, wherein the rubber edging has its outer sides bevelled at an angle substantially corresponding to the tapered surfaces of the pulley flanges for cooperation therewith.

9. In a variable speed transmission mechanism, a belt for use with a pair of pulleys, each pulley having a pair of flanges provided with opposed tapered traction surfaces, said belt comprising a flexible substantially inextensible band and traction members secured to its inner surface, the areas of contact between said band and traction members being spaced slightly from the edges of the band, and the traction members being bevelled sharply from the outer edges of the areas of contact, whereby cutting of the traction members by the edges of the band is avoided.

10. In a variable speed transmission mechanism, a belt for use with a pair of pulleys, each pulley having a pair of flanges provided with opposed tapered traction surfaces, said belt comprising an endless, substantially inextensible, flexible band and traction members secured to its inner surface and lying entirely within the area bounded by the plane of said inner surface, the areas of contact between said band and traction members being spaced slightly from the edges of the band, and the traction members being bevelled sharply from the outer edges of said areas of contact, whereby cutting of the traction members by the edges of the band is avoided.

11. A structure as specified in claim 10, wherein each traction member is formed by longitudinally spaced elements.

12. In a variable speed transmission mechanism, a belt for use with a pair of pulleys, each pulley having a pair of flanges provided with opposed tapered traction surfaces against which the edges of the belt abut, said belt comprising an endless, flexible metal band subject to edge loading where its edges face the opposed traction surfaces of the pulleys as it curves about the latter, and providing stiff, arcuate structures having high resistance to buckling and collapsing under such edge loading, and rubber traction strips secured thereto adjacent the edges thereof, at least a portion of said strips lying within the area bounded by the plane of said band, said portion having a transversely corrugated inner surface, the abutment of the belt edges with the opposed pulley traction surfaces constituting the sole engagement of the belt with the pulleys.

13. In a variable speed transmission mechanism, a belt for use with a pair of pulleys, each pulley having a pair of flanges provided with opposed tapered traction surfaces, said belt comprising a flexible metal band, rubber traction members secured to both faces thereof adjacent the edges, and means on each edge of the band and enclosed by the traction members for preventing cutting of said members by the band edges.

REINOUT P. KROON.